No. 645,670. Patented Mar. 20, 1900.
A. W. OTTIGNON.
DETACHABLE BAIL GUARD OR HANDLE FOR PAILS OR OTHER RECEPTACLES.
(Application filed Dec. 27, 1899.)
(No Model.)
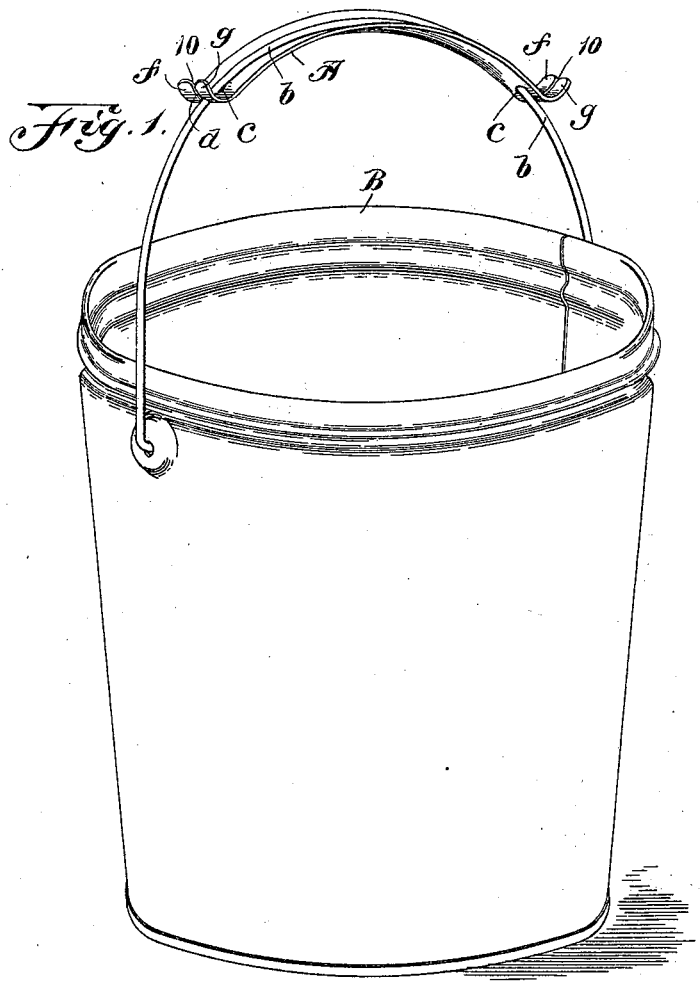
Witnesses
Henry Marsh
Lillian L. Basford
Inventor,
Augustus W. Ottignon
by P. E. Teschemacher
Atty.

UNITED STATES PATENT OFFICE.

AUGUSTUS W. OTTIGNON, OF BOSTON, MASSACHUSETTS.

DETACHABLE BAIL-GUARD OR HANDLE FOR PAILS OR OTHER RECEPTACLES.

SPECIFICATION forming part of Letters Patent No. 645,670, dated March 20, 1900.

Application filed December 27, 1899. Serial No. 741,723. (No model.)

*To all whom it may concern:*

Be it known that I, AUGUSTUS W. OTTIGNON, a citizen of the United States, residing at Boston, in the county of Suffolk and State of Massachusetts, have invented a Detachable Bail-Guard or Handle for Pails or other Receptacles Provided with Bails, of which the following is a specification.

Much inconvenience is experienced in carrying pails and other receptacles having wire bails, especially if heavy, on account of the wire hurting or injuring the hand. To overcome this difficulty and provide a convenient guard or handle which can be readily applied to the bail to afford protection to the hand while carrying the pail or receptacle is the object of my invention, which consists in a bail-guard or handle composed of a longitudinally-curved strip of resilient material having upturned ends, each provided with a slot or aperture and with a slit extending outward from said aperture in a longitudinal direction to the end of the strip, where it terminates in a flaring mouth forming a pair of spring-jaws, between which the bail passes to the slot or aperture at the end of the guard, as hereinafter more fully set forth and claimed.

In the accompanying drawings, Figure 1 is a perspective view of my bail-guard applied to the bail of a pail. Fig. 2 is a perspective view of my bail-guard. Fig. 3 is a transverse vertical section of the same.

In the said drawings, A represents my bail-guard or handle, consisting of a narrow strip of thin material, preferably "leatheroid" or other suitable fibrous material possessing lightness, strength, and especially resiliency to enable it to conform to the curvature of the bail $b$ of a pail or other receptacle B to which it is applied, as shown in Fig. 1. The strip, which is shaped by means of dies or in any other suitable manner, is of concavo-convex form in cross-section and is curved in the direction of its length to enable it to fit the hand comfortably while carrying the pail or receptacle to the bail of which it is attached, the handle being thus arched both longitudinally and transversely to combine strength with lightness, while its resiliency enables it, under the weight of the package while being carried, to conform to the shapes of bails of different degrees of curvature in order that it may lie close to or in contact therewith, as shown.

At each of the upturned ends of the handle A is a slot or aperture $c$ for the reception of the bail $b$, said slot being preferably of oblong form to better accommodate bails passing through the same at different angles owing to their different degrees of curvature.

At each end of the strip A is a slit $d$, communicating with the slot $c$, said slit extending in the direction of the length of the strip and having a flaring mouth 10 to facilitate the entrance of the bail $b$, two spring-jaws $f$ $g$ being thus formed, which readily open to admit the bail and permit it to pass into the slot $c$, after which they instantly close, thereby retaining the handle in place upon the bail as desired, the upturned ends of the handle preventing any liability of its being displaced or detached from the bail while the pail or receptacle is being carried.

To apply the guard or handle A, it is slipped under the bail $b$ and pressure applied in an upward direction to cause the bail to enter the jaws at its opposite ends, the turning upward of the ends of the handle enabling the bail to readily enter the jaws and pass into the slots $c$ as soon as upward pressure is applied to the handle.

The above-described guard or handle will enable a heavy pail or other vessel having a bail to be carried with ease and without hurting the hands and will also be found extremely useful in lifting culinary vessels, where the bail is liable to be hot, thus avoiding the burning of the hands.

What I claim as my invention, and desire to secure by Letters Patent, is—

1. As an improved article of manufacture, a bail-guard or handle composed of a longitudinally-curved strip of resilient material having upturned ends, each provided with a slot or aperture for the reception of the bail, and with a longitudinal slit extending outwardly from said aperture to the end of the strip, forming a pair of upwardly-projecting spring-jaws for holding the handle in place upon the bail, substantially as described.

2. As an improved article of manufacture, a bail-guard or handle composed of a longitudinally-curved strip of resilient material of concavo-convex form in cross-section and having its ends upturned and provided with slots or apertures for the reception of the bail, and with longitudinal slits extending outwardly from said apertures to the ends of the strip and terminating in flaring mouths forming upwardly-projecting spring-jaws for holding the handle in place upon the bail, substantially as described.

Witness my hand this 22d day of December, A. D. 1899.

AUGUSTUS W. OTTIGNON.

In presence of—
P. E. TESCHEMACHER,
LILLIAN I. BASFORD.